United States Patent [19]

Yoshida et al.

[11] 4,015,040

[45] Mar. 29, 1977

[54] CONSTRUCTION MATERIAL WITH CALCIUM SILICATE MONOHYDRATE PRODUCED THEREON IN SITU AND COMPOSITION THEREFOR

[76] Inventors: Akitoshi Yoshida, 991-176, Yahagicho, Chiba; Koichiro Yanagida, 2-7-57, Sakuragaoka, Mino; Shigeki Inoue; Tadanobu Maruyama, both of 4-311, Narashinocho, Funabashi; Reiko Nakamura, 1-18-20, Hirai, Tokyo, all of Japan

[22] Filed: July 1, 1976

[21] Appl. No.: 701,878

Related U.S. Application Data

[63] Continuation of Ser. No. 485,316, July 2, 1974, abandoned.

[30] Foreign Application Priority Data

July 4, 1973   Japan .............................. 48-74898

[52] U.S. Cl. .................... 428/310; 428/313; 428/316; 428/320; 428/325; 428/411; 428/428; 428/433; 428/432; 428/438; 428/442; 428/446; 428/454; 428/469; 428/472; 428/463; 428/464; 428/514; 428/538; 428/539; 428/540; 428/543; 260/29.6 PS; 427/189; 427/201

[51] Int. Cl.² .................... B32B 5/16; B32B 5/18; B32B 5/28; C08L 31/04

[58] Field of Search .......... 428/454, 411, 446, 471, 428/500, 428, 313, 310, 538, 539, 316, 514, 540, 543, 438, 320, 150, 143; 427/216–221, 201, 180, 42, 49; 264/333; 260/29.6 PS; 106/12, 38.3, 120, 286, 287 S, 288

[56] References Cited

UNITED STATES PATENTS

| | | | |
|---|---|---|---|
| 1,238,202 | 8/1917 | Schwerin | 428/540 |
| 3,901,991 | 8/1975 | Ueda et al. | 428/446 |

*Primary Examiner*—P. C. Ives

[57] ABSTRACT

Calcium silicate monohydrate ($2CaO \cdot SiO_2 \cdot H_2O$) can be produced in a coating which has been formed by a coating material containing silica sol alone or silica sol and other additives such as aggregate, viscosity increasing agent, etc. by subjecting the coating to a chemical treatment such as heat-treatment, ultra-violet ray irradiation treatment, etc. in the presence of water and a calcium compound which may be present either in the coating material, or in the treating liquid, or in an object to be coated. The film which contains the calcium silicate monohydrate produced by said chemical treatment has remarkably high hardness and is excellent in water-resistance, water-imperviousness, weather-resistance, and heat-resistance.

8 Claims, No Drawings

CONSTRUCTION MATERIAL WITH CALCIUM SILICATE MONOHYDRATE PRODUCED THEREON IN SITU AND COMPOSITION THEREFOR

This application is a Continuation application of U.S. application Ser. No. 485,316, filed July 2, 1974, abandoned.

BACKGROUND OF THE INVENTION

This invention relates to a film composition of a rigid coating layer of high hardness, and, more particularly, it is concerned with the formation of a rigid coating layer from a coating material containing therein silica sol.

With the progress in the high polymer chemistry, various kinds of useful organic paint have been developed. On the other hand, inorganic paint, owing to its excellent refractoriness and heat-resistance as well as good applicability to an object to be painted, has also been used in many fields which require such inorganic paint. For the forming material of the inorganic coating film or layer, there have been used cement, lime, clay, alkali silicate, alkali phosphate, silica sol, and so forth. Of these various forming materials, silica sol is particularly superior in its heat-resistance and weather-resistance, hence its usefulness has been widely recognized. However, the paint containing therein the silica sol as the film forming material gives a coating film of low hardness, so that it can only be used in a limited field where the coating film does not need so high a hardness. To increase the hardness of the coating film to be formed from the paint containing therein the silica sol, there have been proposed various methods such as, for example, mixing a small amount of alkali silicate into it, or baking the coating film at a high temperature of 500° C or above. These proposed methods, however, are still deficient in that, in the former method, the coating film undergoes a efflorescence and is discolored with lapse of time, and, in the latter method, a separate device to give the required high temperature for the baking is necessary, which reduces practicability of the method.

SUMMARY OF THE INVENTION

With the abovementioned disadvantages inherent in the conventional inorganic paint compositions in mind, it is a primary object of the present invention to provide a film composition of high hardness which is obtained by chemical treatment of the coating formed from a coating material containing silica sol.

It is another object of the present invention to provide a film composition having excellent properties of water-resistance, water-imperviousness, weather-resistance and heat-resistance, with the improvement in hardness by a simple chemical treatment without using alkali silicate.

According to the present invention in one aspect thereof, there is provided a film composition in which calcium silicate monohydrate ($2CaO\ SiO_2\ H_2O$) is produced by chemically treating the coating in the presence of a calcium compound, the said coating being formed from a coating material comprising silica sol alone or silica sol and one or more kinds of aggregate viscosity increasing agent, organic polymer, and colorant such as pigment, said silica sol being dispersed in water and/or hydrophilic organic solvent, containing 0.1 to 70% by weight of $SiO_2$, and having a mol ratio $SiO_2/Me_2O$ (where Me represents monovalent alkali metal atom) of more than 10.

Said chemically treating is as follows:
Treating said coating formed on an object with a solution containing calcium compound, or treating said coating with hot water or ultraviolet ray irradiation while spraying water thereonto intermittently, wherein calcium compound is contained either in said coating or an object to be coated.

According to the present invention, in another aspect thereof, there is provided a coated constructional material obtained by covering the usual constructional object with a film composition containing therein calcium silicate monohydrate formed by chemically treating said coating in the presence of a calcum compound.

The foregoing objects as well as the details of the construction and function of the present invention will become more clearly understandable from the following description thereof, when read in reference to preferred examples.

DETAILED DESCRIPTION OF THE INVENTION

The coating material used in the present invention comprises, as an essential component, silica sol, which is meant by the liquid sol in which silicates or fine particles of silica are dispersed in water, hydrophilic organic solvent or a mixture thereof. The examples of the orgaic dispersing agents for the silica sol are methanol, ethanol, isopropanol, t-butanol, glycerine, glycol, dimethyl formamide, amines, etc.

Thus the typical silica sol used in said coating material prepared by use of these dispersing agents are aqueous silica sol, methanol silica sol, isopropanol-water silica sol, hydrolyzed ethyl silicate, and so on. The content of silica in these silica sols usually ranges from 0.1 to 70% by weight, and is preferably 5 to 50% by weight from the practical usability. The monovalent alkali metals are usually comprised in said silica sol in the mol ratio $siO_2/Me_2O$ (wherein Me represents a monovalent alkali metal atom of Na, K, Li or Cs and $Me_2O$ represents oxide of such an element in the sol) of from 10 to 3000 or above. The silica sol having the mol ratio of less than 10 contains so much depolymerized silicate ion in it that it gives no satisfactory film composition of the present invention. The silica sol having the mol ratio in the range of from 10 to 3000 is easily prepared by such a usual method as, for example, ion exchange method from alkali silicate solution, but that having the mol ratio of above 3000 is not so easily obtained by the above mentioned method. The silica sol produced by partial or complete hydrolysis of alkyl silicate or by dissolving metallic silicon into a strong alkaline organic compound solution comprises substancially no monovalent alkali metal in it, and hence the mol ratio $SiO_2/Me_2O$ is expressed as infinite in this case. Thus the silica sol to be used for the purpose of the present invention may have the mol ratio of from 10 to 3000 or above, although, in general, the silica sol having the mol ratio of from 50 to 2000 mostly prevails. However, silica sol having mol ratio in the range of from 25 to 2000 or of infinite is particularly suitable for the present invention.

The coating material containing silica sol, besides the afore-described meaning, may also contain aggregate, viscosity increasing agent, organic polymer, pigment, etc. In some case, it may contain sedimentation prevention agent, water repellant agent, hardening accelerator, and other additives. Therefore, the coating material containing silic sol in the present invention includes, in a very broad sense, not only general inorganic paint, but also thickening paint material, surface hardening agent, and others.

The aggregate for use in this coating material containing silica sol may be appropriately selected from gravels, hill sands, river sands, seashore sands, glass, pigment, clay, mineral ores, artificial aggregates, powder of inorganic solid materials, refractory materials, and so on. The shape and size of these aggregates may also be chosen in accordance with the purpose of the coating to be produced such as in the form of sphere, rod, fiber, mass, etc. Silica, schamott sand, asbestos fibers and fibrils, glass fibers, glass powder, vermiculite, micro glass balloon, white marble, iron oxide, titanium series pigment, chromium series pigment, and so on are the typical examples of the aggregate.

The viscosity increasing agent to be used are polyacrylates, polyalkylene oxide, water-soluble cellulose, alginic acid and its salts, natural rubber, polysaccharides. The typical examples of these are polyethylene oxide having large molecular weight, methyl cellulose, hydroxyethyl cellulose, carboxymethyl cellulose, sodium polyacrylate, and so on. Bentonite can also be used for this purpose.

The organic polymer to be used generally are emulsions of acrylic polymers, vinyl polymers, and so forth. The typical examples of such organic polymers are poly acrylates or copolymers of acrylates, polymers or copolymers of vinyl acetate.

There is no limitation to the kind of the object to be coated. However, in view of the fact that the coating material is inorganic in nature, those inorganic material such as slate or calcium silicate board, foamed or general non-foamed concrete, mortar, plywood board, gypsum board, pulp cement board, and other constructional materials, as well as structural, metallic, and refractory objects are the applicable ones to be coated.

Formation of the coating with the coating material containing silica sol can be carried out by the same way as in the ordinary painting work such as painting, spraying, impregnation, and immersion followed by drying. The drying is meant in general by drying at a room temperature, drying by infra-red rays, drying by hot air, drying by high frequency heating, and so on.

The coating in the present invention herein designates not only the surface which is exposed directly to the external atmosphere, hence can be observed by naked eye, but also it intends to mean the coated layer and the surface layer of the object to be coated, into which the coating material as applied thereto penetrates and where it becomes hardened and modified. In the case of using the slate or calcium silicate board, foamed concrete, etc. as the object to be coated, impregnation of the coating material is particularly favorable.

The film composition according to the present invention is derived from the coating formed from coating material containing silica sol and followed by a chemical treatment of the coating, and, as already mentioned at the outset, is characterized by containing calcium silicate monohydrate ($2CaO.SiO_2.H_2O$) in it. Existence of calcium silicate monohydrate ($2CaO.SiO_2.H_2O$), which will hereinafter be referred to simply as "monohydrate", can be identified by the X-ray diffraction. The identification by the X-ray diffraction method can be performed by first scraping the film composition by an edged tool such as knife, followed by pulverizing the scraped film, and then placing the pulverized specimen on its holder (made of glass or aluminum) for measurement. The resulted diffraction intensity versus $2\theta$ of the monohydrate is indicated in ASTM card No. 3–0594 for the identification. The following Table shows the X-ray diffraction intensity of the monohydrate.

| $2\theta$ (°) | Relative Intensity |
| --- | --- |
| 21.0 | 40 |
| 23.2 | 20 |
| 29.3 | 100 |
| 31.5 | 60 |

As already mentioned, the characteristic point of the film composition resides in production of the monohydrate after the coating formation, so that no improvement in hardness is attained even if such monohydrate is caused to be included in advance unless the coating is subjected to chemical treatment.

The raw material required to produce the monohydrate in the coating after it is formed is in general a calcium-containing compound preferably having solubility. Calcium compounds of difficult solubility or insolubility may of course be used, if the calcium component in the compounds can be eluted dependng on the pH value of the coating material. The calcium-containing compound to be used for the present invention is ordinary inorganic compounds or organic acid salts of calcium, calcium-containing minerals, and so on. Actual examples of such compound are calcium hydroxide, calcium halide, calcium nitrate, calcium nitrite, calcium carbonate, calcium oxide, calcium sulphate, calcium silicate, calcium phosphate, calcium aluminate, calcium acetate, calcium stearate, rock powder, etc. The calcium compound must be included in the coating material in advance, or be present at the surface part of the object where the coating will be formed, or be included in the coating by any appropriate chemical post-treatment.

In the following, three preferred methods of producing the monohydrate will be described, of which the methods (1) and (2) give the most favorable result. Throughout the method described hereinbelow and the preferred examples of the present invention followed hereinafter, hardness of the coating and film composition is determined by using "MITSUBISHI/uni" pencils of a hardness ranging from 5B to 9H grades. The hardness determining procedure is such that a line or other inscription is drawn on the surface of the coating or film with the pencils of the varying hardness starting from the softest (5B) to the hardest (9H), and, as soon as scratch begins to appear on the coating or film surface, the drawing is stopped and the hardness of the film is represented by the hardness of the pencil used immediately before that which has produced the scratch on the film surface, i.e., the pencil of a softer hardness by one grade. Also, presence of the monohydrate produced is determined by using an X-ray diffraction apparatus of Rigaku Denki K.K., Japan, with which existence of a peak at $2\theta = 29.3°$ is probed under the conditions of a voltage of 30 kV, a current of 10 mA, and using a nickel filter and a copper target.

1. Method of treating the coating for a period of from several tens of minutes to an hour with a liquid such as, for example, water, alcohol, or a mixture thereof which dissolves the calcium compound, e.g., $Ca(OH)_2$, $CaO$, $CaCl_2$, etc.

The inorganic coating material containing silica sol and refractory powder was applied onto a slate board in a quantity of approximately 400 gr/m², and the coating was dried by hot air at 120° C. The coating indicated a hardness range of from H to 3H grade. However, when the coating was boiled for about one hour in a saturated aqueous solution of $Ca(OH)_2$, the coating became hardened to show its hardness of 9H or probably higher. Presence of the monohydrate was also recognized by the X-ray diffraction.

2. Method of treating the coating formed on the object to be coated and containing the calcium compound, or the coating containing the calcium compound by irradiating ultraviolet rays thereto, while spraying water intermittently.

The inorganic coating material containing silica sol and refractory powder was applied onto the surface of light weight foamed concrete produced by the autoclave treatment of lime and silica, for example, and the coating was dried by infra-red ray irradiation, whereupon a coating of a hardness of H was formed on the concrete surface. This coating was then subjected to ultra-violet ray irradiation in air maintained at a temperature of 60° C, while water was sprayed onto the film surface for 6 minutes at every 60 minutes interval. When this operation was repeated continuously for about one month, the coating was found to have improved its hardness to 9H grade or probably higher, and to have been modified to a very fine structure impervious to water. The monohydrate was also found to have been produced.

3. Method of treating the coating formed on the object to be coated which contains the calcium compound, or the coating containing the calcium compound with water which is maintained at a normal or a higher temperature under a normal or a higher pressure. The coating material containing silica sol, the calcium compound, rock powder, etc., for example, was applied onto a metal plate and dried. Hardness of the coated film thus formed indicated B grade. When this coating was treated with heated water under pressure in an autoclave, the monohydrate was recognized to have been produced, and the harness increased to 5H grade.

As described in the foregoing, the film composition according to the present invention does not use alkali silicate, hence no efflorescence takes place. Moreover, hardness of the coating can be improved by a simple chemical treatment with the consequence that it becomes excellent in its water-resistance, water imperviousness, weather-resistance, and heat-resistance, and, in some case, the film assumes very glossy, tile-like surface. In addition, since the coating is modified by the produced monohydrate to become fine structure, it is highly impervious to water. All these improved properties of the film contribute to industrial uses of variety.

PREFERRED EXAMPLES

In order to enable persons skilled in the art to reduce the present invention as detailed in the foregoing to practice, the following preferred examples are presented. It should, however, be noted that the invention is not limited to these examples, but any changes and modifications in the materials to be used and their quantities may be effected within the purview of the present invention as recited in the appended claims. The percentage indications in the examples are all "percent by weight" unless otherwise indicated.

EXAMPLE 1

1,000 g of aqueous silica sol containing 30% of $SiO_2$, and having a mol ratio $SiO_2/Na_2O$ of 150, and a pH value of 9.1 was placed in a stainless steel beaker of 2-liter capacity equipped with an agitator. While agitating the aqueous silica sol, 700 g of silica powder, 90% of which passed through the 325 mesh sieve, 50 g of pulverized titanium oxide, 30g of bentonite, 10 g of acrylic acid polymer (solid content of 50%) as the viscosity increasing agent were added one after the other, and agitated for about 2 hours to prepare a white, inorganic coating material. The coating material indicated viscosity of 430 centipoise (at 20° C), and a pH value of 8.5.

This coating material was applied by a brush onto a foamed concrete panel of a size of 200 mm long, 10 mm wide, and 50 mm thick which had been produced from lime and silica powder as the raw material. After the application, the coating was dried for 15 minutes by the infra-red rays irradiation to form a layer.

On the other hand, for the purpose of comparison, the same coating material was applied onto a foamed concrete panel of the same dimension as mentioned above which had been produced from cement and silica as the raw material (as the object not containing calcium compound), and the same layer was formed on the concrete panel.

The both concrete panels thus coated were subjected to the ultra-violet ray irradiation with intermittent water spraying onto the layer for 50 days by means of a weathermeter Model WE-2 of Toyo Rika Kogyo K.K., Japan, using a sunshine carbon arc. The surface condition, hardness, water imperviousness, and presence of the monohydrate of the film before and after the treatment of both concrete panels are as shown in Table 2 below.

As will be apparent from Table 2, the existence of the monohydrate could be recognized only in the film according to the present invention, in which the hardness was found to have increased. Contrary to this, it was found that the comparative film formed on the object not containing the calcium compound had not only not produced the monohydrate by the ultra-violet ray irradiation, but also it had been deteriorated.

Table 2

| Object to be coated Properties coated film Ultraviolet pay Irradiation | Foamed Concrete Produced from CaO and Silica | | | | Foamed Concrete Produced from Cement and Silica | | | |
| --- | --- | --- | --- | --- | --- | --- | --- | --- |
| | Monohydrate | Hardness | Surface Condition | Water Imperviousness | Monohydrate | Hardness | Surface Condition | Water Imperviousness |
| Before | | | frosted and | | | | frosted and | |

Table 2-continued

| Object to be coated Properties coated film | Foamed Concrete Produced from CaO and Silica | | | | Foamed Concrete Produced from Cement and Silica | | | |
|---|---|---|---|---|---|---|---|---|
| Ultraviolet pay Irradiation | Mono-hyd-rate | Hard-ness | Surface Condition | Water Imperviousness | Mono-hyd-rate | Hard-ness | Surface Condition | Water Imperviousness |
| Treatment | none | 2H | slightly hard | 45 | none | 3H | slightly hard | 43 |
| After Treatment | clearly recognized | 9H or higher | glossy and tile-like | 1 | none | 5B | powdery | 65 |

Note: The water imperviousness was measured in such a manner that the film surface was placed flat, on which a glass cylinder of 2 cm in inner diameter and 35 cm in height was placed upright. The contact surface between the film surface and the glass cylinder was adhered by an adhesive. After drying the adhesive, water was poured in the glass cylinder up to a height of 30 cm, and the absorbed quantity thereof after 24 hours was measured by the reduction in height of the water in the cylinder (mm/24 hrs.)

EXAMPLE 2

1,000 g of aqueous silica sol containing 20% of $SiO_2$ and 1.5% in solid content of monomethyl triethanol ammonium hydroxide, and having a mol ratio $SiO_2/Na_2O$ of 900 and a pH value of 11.5 was placed in a stainless steel beaker of 2-liter capacity equipped with an agitator. While agitating the aqueous silica sol, 2,200 g of zirconium silicate powder which passed through 325 mesh sieve, 6 g of chromic oxide as the pigment, and 8 g of sodium polyacrylate powder were added one after the other, and the whole batch was further agitated for 30 minutes. After this, there was added 800 g of calcium carbonate in approximately 100 mesh size and the agitation was continued for 10 minutes, whereby a light green lithin materal having a viscosity of 15,000 centipoise (at 20° C) was produced.

On the other hand, for the sake of comparison, the similar light green lithin material having a viscosity of 14,000 centipoise (at 20° C) was prepared by the exactly same procedure as above except for use of aqueous solution of lithium silicate containing 20% of $SiO_2$ and having a mol ratio between $SiO_2$ and $Li_2O$ of 4.5 in place of 1 kg of aqueous silica sol.

Each of these two lithin materials was applied by a roller onto three sheets of slate board of a dimension of 200 mm long, 100 mm wide, and 4 mm thick in a quantity of 2.5 kg/m² thereby producing decorated panels. After drying the thus decorated panels for a whole day and night, each panel was immersed in 2 liters of boiling service water containing therein 50 g of calcium hydroxide, and treated for 30 minutes, 1 hour, and 2 hours, respectively. The results are as shown in Table 3 below.

Table 3

| Boiling Treatment in Ca(OH)₂ | Silica Sol Containing Paint | | | Lithium Silicate Containing Paint | | |
|---|---|---|---|---|---|---|
| | Mono-hydrate | Hardness | Surface Condition | Mono-hydrate | Hardness | Surface Condition |
| Not-treated | none | HB | slightly hard, uniform coated film | none | 2H | Slightly hard and uniform coated film |
| 30 minutes | very slightly present | 3H | hard & uniform coated film | none | B | powdering generated |
| 1 hour | slightly present | 9H and higher | very hard & uniform coated film | very slightly present | 5B | blistering here and there |
| 2 hours | present | 9H and higher | very hard & uniform coated film | very slightly present | 5B and lower | remarkable peeling |

As will be apparent from the above Table 3, the film formed by the silica sol containing paint shows remarkable increase in the monohydrate content due to treatment with calcium hydroxide, hence remarkable improvement in hardness, while the lithium silicate containing paint did not almost produce the monohydrate, and deterioration in the surface condition of the film as rather recognized.

Further, the abovementioned test pieces were subjected to boiling for 5 hours in pure water for testing resistance against boiling water. The results are as shown in Table 4 below, from which the film according to the present invention are found to be perfect in its anti-boiling water property.

Table 4

| Boiling Treatment in Ca(OH)₂ | Results of Anti-Boiling Water Test | |
|---|---|---|
| | Silica Sol Containing Paint | Lithium Silicate Containing Paint |
| Non-treated | Film peeled off after 33 minutes' boiling | Film peeled off after 5 minutes' boiling |

Table 4-continued

| Boiling Treatment in Ca(OH)$_2$ | Results of Anti-Boiling Water Test | |
|---|---|---|
| | Silica Sol Containing Paint | Lithium Silicate Containing Paint |
| 30 minutes | (*)Uniform seated film of 4H grade hardness | Film peeled off after 2 minutes' boiling |
| 1 hour | (*)Very hard and uniform coated film of 9H and higher grade hardness | Film peeled off immediately |
| 2 hours | (*)'''' | '''' |

Note:
(*)The film according to the present invention

EXAMPLE 3

To 900 g of methanol silica sol containing 35% of Sio$_2$, 20% of H$_2$O, 45% of CH$_3$OH and having a mol ratio SiO$_2$/Na$_2$O of 900, there was added 100 g of thanol silica sol resulted from hydrolysis of ethyl silicate with sulfuric acid, and containing 30% of SiO$_2$, but not containing alkali metal, whereby 1 kg of a mixed binder was obtained. This mixed binder was placed in the stainless steel beaker of 2-liter capacity equipped with an agitator same as in Example 1 above, and subjected to agitation. While agitating, 800 g of silica powder, 97% of which passed through the 325 mesh sieve, 20 g of pulverized titanium oxide, 30 g of methanol solution of vinyl acetate resin (the solid content of 50%) were added to the mixed binder one after the other, and agiatated for 30 minutes to prepare a white inorganic paint. 200 g of pulverized calcium carbonate passed through the 325 mesh sieve was further added to this inorganic paint and agitated. Thereafter, the coating material was spray-coated on three sheets of steel plate, each having a size of 200 mm long and 100 mm wide and with its surface having been sandblasted, in a quantity of 300 g/m$^2$. The coating was dried for a whole day and night at a room temperature. Hardness of the thus formed film was 2B grade, and no monohydrate could be recognized to have been present by the X-ray diffraction.

Each test specimen having the film was put in an autoclave containing water, and the temperature was raised from a room temperature to 150° C at a rate of 2° C/min. The water in the autoclave was maintained at the elevated temperature for one hour, after which it was dropped to the room temperature at a rate of 4° C/min. Then, the test specimens were taken out of the autoclave and dried. Hardness of the film was found to be 8H grade and of very fine structure. Presence of the monohydrate in the film could be verified by the X-ray diffraction.

EXAMPLE 4

150 g of aqueous emulsion of methyl polyacrylate (solid content of 50%) was added to 900 g of silica sol dispersed in water-isopropanol mixture containing 40% of SiO$_2$, 50% of water, 10% of isopropanol, and having a mol ratio SiO$_2$/K$_2$O of 210 and a pH value of 8.0, whereby a coating liquid was obtained.

This liquid was then impregnated into the foamed concrete produced from lime and silica as the raw material at a rate of 2 kg/m$^2$, followed by drying at a room temperature and further drying thereater at 150° C for 3 hours. The resulted surface of the foamed concrete showed a hardness of 3B grade. No monohydrate could be recognized in this impregnated layer as the result of the X-ray diffraction.

Next, the steel plates impregnated with the coating liquid were treated in boiling water at 100° C for 5 hours followed by drying. The surface of the impregnated layer was found to have increased to a hardness of 2H grade. The monohydrate could be apparently verified to have existed by the X-ray diffraction of this impregnated layer.

What is claimed is:

1. A construction material covered with a film composition on a construction object containing calcium silicate monohydrate, 2CaO.SiO$_2$.H$_2$O, produced in situ by reacting a coating with a calcium compound in the presence of water, said calcium compound selected from the group consisting of calcium hydroxide, calcium halide, calcium nitrate, calcium nitrite, calcium carbonate, calcium oxide, calcium sulfate, calcium silicate, calcium phosphate, and calcium salts of organic acids, said coating being formed from a coating material which comprises a silica sol dispersed in a medium selected from the group consisting of water, methanol, ethanol isopropanol and a mixture thereof, at least one kind of aggregate, at least one kind of viscosity increasing agent selected from the group consisting of polyacrylic acid and sodium polyacrylate, at least one kind of organic polymer, as an aqueous emulsion, selected from the group consisting of polyvinylacetate and polyacrylate, and pigment, said silica sol containing 5 to 50% by weight of SiO$_2$ and having a mol ratio SiO$_2$/Me$_2$O, wherein Me represents monovalent alkali metal atom, of more than 25.

2. The construction material according to claim 1 wherein said construction object is in the form of slate board, calcium silicate board, foamed or non-foamed concrete, mortar, plywood board, gypsum board or pulp cement board.

3. A construction material covered with a film composition on a construction object containing calcium silicate monohydrate, 2CaO.SiO$_2$.H$_2$O, produced in situ by reacting said coating with an aqueous solution of at least one calcium compound selected from the group consisting of calcium hydroxide, calcium halide, calcium nitrate, calcium nitrite, calcium carbonate, calcium oxide, calcium sulfate, calcium silicate, calcium phosphate and calcium salts of organic acids, maintained at a temperature of 50° C or above, said coating being formed from a coating material which comprises an aqueous silica sol, at least one kind of aggregate, at least one kind of viscosity increasing agent selected from the group consisting of polyacrylic acid and sodium polyacrylate, at least one kind of organic polymer, as an aqueous emulsion, selected from the group consisting of polyvinylacetate and polyacrylate, and pigment, said silica sol dispersed in water and containing 5 to 50% by weight of SiO$_2$ and having a mole ratio SiO$_2$/Me$_2$O, wherein Me represents monovalent alkali metal atom, of more than 25.

4. A construction material covered with a film composition on a construction object containing calcium silicate monohydrate, 2CaO.SiO$_2$.H$_2$O, produced in situ by irradiating a coating formed by applying a coating material necessarily containing the calcium compound on said object to be coated which does not contain the calcium compound, by applying said coating material containing the calcium compound on said object to be coated which contains the calcium compound, and by applying said coating material not containing the calcium compound to an object which contains the calcium compound, treatment with ultra-violet irradiation, while spraying water thereonto intermittently, said calcium compound being at least one selected from the group consisting of calcium hydroxide, calcium halide, calcium nitrate, calcium nitrite, calcium carbonate, calcium oxide, calcium sulfate, calcium silicate, calcium phosphate and calcium salts of organic acids, said coating being obtained from a coating material which comprises an aqueous silica sol at least one kind of aggregate, at least one kind of viscosity increasing agent selected from the group consisting of polyacrylic acid and sodium polyacrylate, at least one kind of organic polymer, as an aqueous emulsion, selected from the group consisting of polyvinylacetate and polyacrylate, and pigment, said silica sol being dispersed in water and containing 5 to 50% by weight of $SiO_2$ having a mol ratio $SiO_2/Me_2O$, wherein Me represents monovalent alkali metal atom, of more than 25.

5. A construction material covered with a film composition on a construction object containing calcium silicate monohydrate, $2CaO.SiO_2.H_2O$, produced in situ by reacting a coating formed by applying a coating material necessarily containing the calcium compound on said object to be coated which does not contain the calcium compound, by applying said coating material containing the calcium compound on said object to be coated which contans the calcium compound, and by applying said coating material not containing the calcium compound to an object which contains the calcium compound and treating with water maintained at a temperature higher than 50° C, said calcium compound being at least one selected from the group consisting of calcium hydroxide, calcium halide, calcium nitrate, calcium nitrite, calcium carbonate, calcium oxide, calcium sulfate, calcium silicate, calcium phosphate and calcium salts of organic acids, said coating being obtained from a coating material which comprises an aqueous silica sol, at least one kind of aggregate, at least one kind of viscosity increasing agent selected from the group consisting of polyacrylic acid and sodium polyacrylate, at least one kind of organic polymer, as an aqueous emulsion, selected from the group consisting of polyvinylacetate and polyacrylate, and pigment, said silica sol being dispersed in water and containing 5 to 50% by weight of $SiO_2$ and having a mol ratio $SiO_2/Me_2O$, wherein Me represents monovalent alkali metal atom, of more than 25.

6. A film composition for coating construction materials comprising calcium silicate monohydrate, $2CaO.SiO_2.H_2O$, produced in situ by reacting a calcium compound in the presence of water with a silica sol dispersed in a medium of at least one of the group consisting of water, methanol, ethanol, isopropanol and t-butanol, containing 5 to 50% by weight of $SiO_2$ and having a mole ratio, $SiO_2/Me_2O$, wherein Me represents monovalent alkali metal atom, of more than 25, in the presence of at least one kind of aggregate, at least one kind of viscosity increasing agent selected from the group consisting of polyacrylic acid and sodium polyacrylate, at least one kind of organic polymer, as an aqueous emulsion, selected from the group consisting of polyvinylacetate and polyacrylate, and pigment.

7. The film composition according to claim 6 further comprising at least one kind of aggregate selected from the group consisting of gravels, sands, glass pigment, clay, mineral ores, powdered inorganic solids, and refractory materials.

8. The film composition according to claim 6, wherein said calcium compound is at least one selected from the group consisting of calcium hydroxide, calcium halide, calcium nitrate, calcium nitrate, calcium carbonate, calcium oxide, calcium sulfate, calcium silicate, calcium phosphate and calcium salts of organic acids.

* * * * *